Patented Feb. 5, 1952

2,584,340

UNITED STATES PATENT OFFICE 2,584,340

REACTION OF ORGANOSILANE WITH GLYCERINE-DICARBOXYLIC ACID ESTER AND DICARBOXYLIC ACID

John T. Goodwin, Jr., and Melvin J. Hunter, Midland, Mich., assignors to Dow Corning Corporation, Midland, Mich., a corporation of Michigan No Drawing. Application January 7, 1950, Serial No. 137,471

1 Claim. (Cl. 260—45.4)

This invention relates to resinous, thermosetting compositions of matter.

The copending application of Melvin J. Hunter et al., Serial No. 59,414, filed November 10, 1948, discloses and claims resin compositions prepared by reacting a silane with a polyhydric alcohol and thereafter reacting the product with a polybasic acid. Resins prepared in this manner are of great utility as coating compositions, such as paint vehicles and wire enamels. However, only a limited range of compositions can be prepared by this method, due to incompatibility.

It is an object of this invention to prepare resinous materials which possess physical properties not obtainable by any previously known method. Another object is to prepare resinous materials which combine heat stability, toughness, and solvent resistance to a degree heretofore unknown.

In accordance with this invention a silane is reacted with a glycerine ester of a dicarboxylic acid, and the resulting silane-glyceride is reacted wiht an additional amount of an acidic compound of the group dicarboxylic acids and anhydrides thereof.

The silanes of this invention have the formula $R_nSiX_{4-n}$ where R is a monovalent hydrocarbon radical, X is alkoxy, acyloxy or chlorine, and $n$ has a value from 0.9 to 2.1.

The glycerine esters employed herein are the reaction product of glycerine and a dicarboxylic acid or anhydride thereof, which materials are reacted in amount such that the ratio of glycerine OH to the acid groups is from 2.25:1 to 3:1. Such esters have on the average from 3 to 4 unreacted glycerine hydroxyls which are free to react with the silane and additional acid. The reaction of the glycerine and acid is carried out in the conventional manner for preparing glycerides.

The silane and the glycerine ester are reacted in amount so that the ratio of silane X radicals to glycerine OH in excess of carboxyl is from 0.1:1 to 0.53:1 and the resulting silane-glycerine ester is reacted with an additional amount of a dibasic acid or anhydride thereof in amount so that the ratio of the sum of the total acid groups plus the silane X radicals to the glycerine OH radicals is from 0.9 to 1.2. Thus, in the final resin there may be either an excess of OH radicals or an excess of carboxyl groups, or the silane X radicals, OH groups and carboxyl groups may be balanced.

In this invention the term "acid group" has reference to carboxyl and anhydride groups, it being understood that an anhydride group is considered equivalent to two carboxyl groups.

The basic reaction involved in preparing the silane-glycerine ester may be represented schematically as follows:

Reaction between the silane and the glycerine ester is produced by bringing the two into contact, whereupon reaction begins at once with the formation of the silane-glycerine ester and the elimination of alcohol or hydrogen chloride. The reaction may be carried out at temperatures ranging from below 30° C. up to 250° C. In general, with chlorosilanes the reaction proceeds smoothly at room temperature, although in those cases in which the glycerine ester is quite viscous at 30° C., it is desirable to heat the reaction mixture in order to insure thorough mixing of the reactants. When the silane X is alkoxy, it is preferred that the reaction be carried out at temperatures between 100° C. and 200° C. In either case the reaction is continued until substantially the theoretical amount of by-product has been removed.

In the above-defined silanes any alkoxy group, such as for example, methoxy, ethoxy, butoxy, or stearyloxy, may be present.

Whereas resinous materials are obtained when any acyloxy group is employed, for the purpose of this invention it is preferred that the acyloxy radical be one which contains at least seven carbon atoms. Examples of the preferred radicals which produce beneficial modifications such as improved solubility in hydrocarbon solvents are stearyloxy, 2-ethyl hexoyloxy, benzoyloxy, and linoleyloxy. Thus, it can be seen that the hydrocarbon portion of the acyloxy group may be either monocyclic aryl, saturated aliphatic, or unsaturated aliphatic.

Acyloxy silanes may be prepared by reacting carboxylic acids with alkoxy silanes or by reacting salts of carboxylic acids with chlorosilanes. In the former case an alcohol is the by-product, while in the latter the halogen salt is split out.

The silanes employed in the method of this invention have from 0.9 to 2.1 monovalent hydrocarbon radicals per silicon atom. It has been found that satisfactory coating compositions are obtained when saturated aliphatic hydrocarbon radicals containing less than seven carbon atoms, such as methyl, ethyl, propyl, butyl, cyclohexyl, and cyclopentyl, and monocyclic aryl radicals such as phenyl, tolyl, chlorophenyl and xylyl are employed. It is to be understood that any combination of the above-defined groups may be present in the silane and that the silane may be a mixture of $SiX_4$, $RSiX_3$, $R_2SiX_2$ and $R_3SiX$ so proportioned as to give the above degree of substitution.

The glycerine esters employed herein are in the form of viscous fluids having a low degree of polymerization. Theoretically, the esters have an average degree of polymerization of 2 and respond to the formula $HOCH_2CHOHCH_2OOCRCOOCH_2CHOHCH_2OH$ when the molar ratio of glycerine to acid is 2 and a mixture of the above and $HOCH_2CHOHCH_2OOCRCOOH$ when the molar ratio is between 1.5 and 2. These esters are completely soluble in polar organic solvents such as alcohols and are not resinous in character.

The acidic compounds employed to make the glycerine esters and to react further with the silane-glycerine esters are dicarboxylic acids and anhydrides thereof. Any acid having the formula HOOCRCOOH or its anhydride, in which R is a divalent aryl or divalent aliphatic radical, produces satisfactory resinous materials when employed in the method of this invention. Examples of such acids are phthalic, malonic, maleic and fumaric.

The silane-glycerine ester is reacted with an additional amount of the acidic compound. The reaction is carried out by heating a mixture of the two, preferably at a temperature between 100° C. and 250° C. Usually the temperature is maintained between 175° C. and 210° C. Under these conditions the acid reacts with the silane-glycerine ester to produce polymeric resinous materials. The reaction may proceed by either of two mechanisms. One is a condensation of an acid group with a glycerine hydroxyl, and the other is the splitting of the SiOC linkages in the ester, whereby the acid becomes attached directly to the silicon. This reaction may be represented schematically by the equation

The latter phenomenon is readily observed when an acid anhydride is reacted with a silane-glycerine ester in which the ratio of silane X to OH is 1. In such an ester there are essentially no free OH's. Yet the anhydride readily reacts with the ester, as is shown by a rapid fall in the acid number and the resinification of the product.

The reaction of the acid compound and the silane-glycerine ester is continued until the desired state of polymerization is obtained. It has been found convenient to stop the reaction when the product shows a tendency to string or wrap around the agitator. In such a state the product is still soluble in solvents such as cyclohexanol, ketones, and aromatic hydocarbons. Thus, the material may be readily applied as a solution to the surfaces of a base member.

Normally, the above process is carried out in the absence of any solvent. However, if desired, solvents such as aromatic hydrocarbons, alcohols, or ketones may be employed.

When the materials obtained by the above method are placed upon metal surfaces and heated at temperatures of 100° to 250° C., a firmly adhering, hard, flexible, solvent-resistant coating is obtained. These coatings possess a combination of thermal stability, stress-strain properties and resistance to solvents which are not shown by resins heretofore known. The thermal stability approaches that of siloxane resins, while their high flow-point and resistance to solvents at elevated temperature is essentially as good as thermosetting organic resins such as alkyds. Such a combination of properties makes the resins prepared by the method of this invention eminently suitable for high-temperature magnet wire enamel and high-temperature paint vehicles.

The thermal stability of the instant materials is such that they may be heated at temperatures up to 250° C. for prolonged periods of time without appreciable decomposition.

The following examples are illustrative only of this invention.

*Example 1*

A mixture of 4 gram mols U. S. P. glycerine and 2 gram mols of phthalic anhydride was heated at a temperature of from 97° C. to 209° C. for nine hours. Water distilled from the reaction mixture. $CO_2$ was passed through the mixture during the last three hours of heating in order to aid in the removal of water. The glycerine ester was obtained as a viscous fluid. A mixture of 1.8 gram mols of phenylmethyldichlorosilane and .2 gram mols of phenyltrichlorosilane was added to the ester with agitation at a temperature of from 82° C. to 107° C. over a period of three hours. HCl was evolved, and heating was continued at 103° C. to 200° C. for an additional six and a half hours. The reaction mixture was cooled to 160° C., and 1.9 gram mols of phthalic anhydride was added thereto. The mixture was then heated at a temperature up to 206° C. for six hours, whereupon a thermosetting resin was obtained.

*Example 2*

.6 gram mols of 2-ethyl hexoic acid was reacted with 0.5 gram mols of phenyltriethoxysilane by heating the mixture for two hours at a temperature up to 197° C. 14 grams of ethyl alcohol distilled.

1.5 gram mols of glycerine was reacted with .75 gram mols of phthalic anhydride by heating a mixture of the two at a temperature of 200° C. until 15 grams of water distilled. The glyceryl phthalate was added to the silane, and the mixture was heated at up to 180° C. for three hours, and 63 grams of ethyl alcohol was removed. .75 gram mols of phthalic anhydride was then added to the mixture, and heating was continued at 180° C. The heating was continued until the mixture began to wrap around the agitator, whereupon the mixture was diluted with 235 grams of xylene. The resin was applied to the surface of a metal panel and baked, produced a satisfactory coating thereon.

*Example 3*

.5 gram mols of phthalic anhydride and 1 gram mol of glycerine were heated at a temperature up to 180° C. and water was removed by distillation. The resulting glyceryl phthalate was reacted with .5 gram mols of phenylmethyldiethoxysilane at a temperature up to 210° C. Ethyl alcohol distilled. After about the theoretical amount of alcohol had been removed, .5 gram mols of phthalic anhydride was added to the mixture, and heating at 180° C. was continued until the material showed signs of gelation. The residue was dissolved in cyclohexanol.

A tin plate was coated with the resin solution and thereafter cured one hour at 200° C., whereupon a hard, brittle, firmly adhering coat was obtained.

A No. 24 copper wire was coated with the resin solution and heated in a wire tower at a temperature up to 400° C. for about one minute. The resulting film was flexible enough so that it did not crack when the wire was bent around a mandrel one and one half times the diameter of the wire. The film had a scrape hardness of 15 oz. at 30° C. and an elongation greater than that of the copper wire, which broke at 30 per cent elongation. The resin film had a softening point of 280° C. The scrape hardness was 13 after one hour in toluene at room temperature and after sixteen hours at 80° C. at 90 per cent relative humidity. These prove excellent solvent resistance and excellent resistance to moisture. The above tests show that the resin is excellent for use as wire enamel.

Example 4

When 1 gram mol of phenylmethyldiethoxysilane is reacted with 2 gram mols of 2-ethylhexoic acid at 170° C. to 200° C., 2 gram mols of ethyl alcohol is removed and the product is phenylmethyldi(2-ethyl hexoyloxy) silane.

When this silane is reacted with the glyceryl phthalate of Example 1 in amount such that the ratio of acyloxy groups to OH is 0.5 and the resulting silane-glycerine ester is reacted with phthalic anhydride in amount such that the ratio of glycerine OH to the sum of acyloxy groups plus total carboxyl groups is 1, a thermosetting resin is obtained.

That which is claimed is:

The method of preparing resinous compositions which comprises reacting a silane of the formula $R_nSiX_{4-n}$, in which R is selected from the group consisting of saturated aliphatic radicals of less than seven carbon atoms and monocyclic aryl radicals, X is selected from the group consisting of alkoxy, acyloxy, and chlorine said acyloxy group being of the formula RCOO—, where R is a hydrocarbon radical, and $n$ has a value from 0.9 to 2.1, with a glycerine ester formed by reacting glycerine with an acidic compound selected from the group consisting of dicarboxylic acids and anhydrides thereof in amount such that the ratio of glycerine OH to acid groups is from 2.25:1 to 3:1, said glycerine ester being employed in amount such that the ratio of silane X radicals to glycerine OH in excess of carboxyl radicals is from 0.1:1 to .53:1 and thereafter reacting the product thereby obtained with an acidic compound selected from the group consisting of dicarboxylic acids and anhydrides thereof in amount such that the ratio of the sum of the total dicarboxylic acid carboxyl radicals plus silane X radicals to glycerine OH radicals is from 1:0.9 to 1:1.2.

JOHN T. GOODWIN, Jr.
MELVIN J. HUNTER.

REFERENCES CITED

The following references are of record in the file of this patent:

UNITED STATES PATENTS

| Number | Name | Date |
| --- | --- | --- |
| 2,395,550 | Iler et al. | Feb. 26, 1946 |
| 2,426,121 | Rust et al. | Aug. 19, 1947 |
| 2,441,066 | Hanford | May 4, 1948 |
| 2,529,956 | Myles et al. | Nov. 14, 1950 |

FOREIGN PATENTS

| Number | Country | Date |
| --- | --- | --- |
| 583,754 | Great Britain | Dec. 30, 1946 |